United States Patent
Kurz et al.

(10) Patent No.: US 6,626,257 B2
(45) Date of Patent: Sep. 30, 2003

(54) METHOD AND DEVICE FOR AUTOMATIC SPEED ADJUSTMENT IN A VEHICLE

(75) Inventors: Gerhard Kurz, Wendlingen (DE); Hans-Dieter Multhaupt, Stuttgart (DE); Thomas Röhrig-Gericke, Weil im Schönbuch (DE); Reinhold Schöb, Gäufelden (DE); Harry Tröster, Tamm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/129,556

(22) PCT Filed: Aug. 1, 2001

(86) PCT No.: PCT/EP01/08875
§ 371 (c)(1),
(2), (4) Date: May 8, 2002

(87) PCT Pub. No.: WO02/12011
PCT Pub. Date: Feb. 14, 2002

(65) Prior Publication Data
US 2002/0179355 A1 Dec. 5, 2002

(30) Foreign Application Priority Data
Aug. 3, 2000 (DE) .......................................... 100 37 826

(51) Int. Cl.$^7$ ................................................. B60Q 1/00
(52) U.S. Cl. .......................... 180/169; 180/179; 701/96
(58) Field of Search ................................. 180/169, 170, 180/168, 167, 178, 179; 701/96, 119, 301

(56) References Cited

U.S. PATENT DOCUMENTS

| | | | | |
|---|---|---|---|---|
| 5,014,200 A | * | 5/1991 | Chundrlik et al. | 364/428.04 |
| 5,230,400 A | * | 7/1993 | Kakinami et al. | 180/169 |
| 5,234,071 A | * | 8/1993 | Kajiwara | 180/169 |
| 5,493,302 A | | 2/1996 | Woll et al. | |
| 5,529,139 A | * | 6/1996 | Kurahashi et al. | 180/169 |
| 6,212,465 B1 | * | 4/2001 | Sielagoski et al. | 701/96 |
| 6,240,356 B1 | * | 5/2001 | Lapke | 701/93 |
| 6,311,121 B1 | * | 10/2001 | Kuragaki et al. | 701/96 |
| 6,339,740 B1 | * | 1/2002 | Seto et al. | 701/96 |
| 6,397,140 B2 | * | 5/2002 | Minowa et al. | 701/96 |
| 6,529,814 B2 | * | 3/2003 | Ishizu et al. | 701/96 |

FOREIGN PATENT DOCUMENTS

| | | |
|---|---|---|
| DE | 41 00 993 | 7/1991 |
| DE | 196 39 907 | 4/1997 |
| EP | 1 008 482 | 6/2000 |

* cited by examiner

Primary Examiner—Avraham Lerner
(74) Attorney, Agent, or Firm—Crowell & Moring LLP

(57) ABSTRACT

A method and apparatus for automatically setting the speed in a vehicle, with the distance and relative speed between the vehicle and an obstacle determined and used as the basis for the calculation of a braking torque and drive torque which are to be generated independently of the driver in order to approximate the vehicle actual speed to a calculated setpoint speed. The speed of the vehicle is adapted to the speed of the obstacle, in which respect a maximum permissible limiting speed must not be exceeded.

13 Claims, 3 Drawing Sheets

METHOD AND DEVICE FOR AUTOMATIC SPEED ADJUSTMENT IN A VEHICLE

BACKGROUND AND SUMMARY OF THE INVENTION

This application claims the priority of German Application No. 100 37 826.9, filed Aug. 3, 2000 and PCT International Application No. PCT/EP01/08875 filed Aug. 1, 2001, the disclosures of which are expressly incorporated by reference herein.

The invention relates to a method and a device for automatically setting the speed in a vehicle.

The German publication DE 41 00 993 A1 discloses a system for automatically controlling the longitudinal movement of a vehicle and the follow-up travel with respect to a vehicle travelling ahead. According to this system, the distance and the relative speed between the vehicle and the vehicle travelling ahead are determined. The measurement signals are fed to a control unit in which actuation signals, which are fed to actuation elements in the vehicle for automatically setting the vehicle actual speed and the vehicle setpoint speed, are generated from the values of the measurement signals taking into account a predefined conversion relationship.

This system which includes a follow-up control device also permits the vehicle to operate in the stop-and-go mode. In this mode, the following vehicle automatically starts up from a standstill if the vehicle travelling ahead also starts up and the distance between the vehicles is also smaller than a predefined setpoint vehicle distance. The following vehicle accelerates away from a standstill, the vehicle speed of the following vehicle being able to temporarily exceed that of the vehicle travelling ahead until the setpoint distance between the vehicles is re-established. The setpoint distance between the vehicles is also maintained if the vehicle travelling ahead reduces its speed. If the vehicle travelling ahead comes to a standstill, the speed of the following vehicle is also reduced to zero.

This system permits a vehicle to automatically follow a vehicle travelling ahead. In particular, in the lower speed range there is a problem here that frequent starting up from a standstill up to different speeds and renewed braking to a standstill can adversely affect comfort. Furthermore, hazardous situations may arise if in backed-up traffic a relatively high speed is reached briefly in the column of vehicles and in this situation a vehicle moves into the gap between the vehicle which is following and the vehicle travelling ahead, in response to which the system in the vehicle which is following must initiate a comparatively severe braking operation, which entails the risk of rear-end collisions. This problem is also exacerbated by the fact that the speed of the vehicle which is following can briefly exceed the speed of the vehicle travelling ahead so that the vehicle which is following must, in certain circumstances, brake starting from a high speed level.

The invention is based on the problem of improving travelling comfort and travelling safety in vehicles with automatic speed setting.

According to the method in accordance with the invention, a maximum permissible limiting speed is first either predefined or determined from current measurement variables and status variables of the vehicle. If the measurement reveals that the obstacle—for example a vehicle travelling ahead—is moving away from the vehicle, a vehicle setpoint speed which is to be adopted by the vehicle and which the vehicle is not allowed to exceed is determined. The setpoint speed is set to the smaller value of a pair of values formed from the limiting speed and the current speed of the obstacle—in particular of the vehicle travelling ahead. The vehicle actual speed is adjusted to the setpoint speed.

This method ensures that the speed of the vehicle which is following cannot exceed a maximum value, specifically the limiting speed which is to be predefined or determined. This limiting speed cannot be exceeded by the vehicle which is following, even if the speed of the vehicle which is travelling ahead exceeds the limiting speed. In this case, the distance between the vehicle and the vehicle which is travelling ahead increases; but this provides the vehicle occupants of the vehicle which is following with a considerably greater degree of comfort because, in particular in backed-up traffic, short-term acceleration operations and in particular braking operations are eliminated, because the vehicle which is following now follows at an essentially constant speed. Furthermore, safety is improved because vehicles which move into the gap arising between the vehicle which is following and the vehicle travelling ahead no longer give rise to abrupt braking operations in the vehicle which is following because the vehicle which is following is moving at a relatively low speed level.

Maintaining a constant speed when the vehicle travelling ahead adopts a vehicle speed which exceeds the limiting speed results, in backed-up traffic, in a situation in which the vehicle which is following moves at a continuous speed and steadily approaches the end of a column of vehicles which is forming again, and joins on behind the vehicle which is travelling ahead. The steady method of movement avoids the harmonica effect which usually forms in backed-up traffic due to the fact that vehicles are accelerated heavily away from a standstill or from very low speeds and are then abruptly braked again. In addition to improving travelling comfort and increasing travelling safety, this also results in less emission of pollutants.

In a preferred development, the automatic setting of the speed is actuated in a case in which the distance between the vehicle and the vehicle travelling ahead drops below a proximity limit. This criterion can be used, in particular in conjunction with a limiting speed which is set at a low level and which signifies a crawling speed, for triggering the automatic setting of the speed when travelling in backed-up traffic or in heavy town traffic because limiting the vehicle actual speed usually has no negative effects on such journeys because the average speed is comparatively low in any case. The automatic braking of the vehicle to a standstill avoids the risk of accidentally colliding with the obstacle which is travelling ahead.

The method can also be used with obstacles other than vehicles. It is in particular possible to use the method as a parking aid, in which case fixed obstacles can be detected and trigger braking of the vehicle to a standstill.

In a preferred development, it may be specified that after the automatic setting of the speed is activated, the vehicle is automatically braked to a standstill, despite the fact that the obstacle travelling ahead is continuing to move, if the distance between the vehicle and the obstacle drops below a minimum distance. As a result, a minimum safety distance between the vehicle and obstacle is ensured. As soon as the minimum distance is exceeded again, the vehicle is expediently moved off again.

According to one further advantageous embodiment, at least in defined travel situations, if appropriate over the entire activation time of the automatic setting of the speed, a minimum braking torque is generated by means of the vehicle brake in order to achieve the lowest possible vehicle reaction time during braking operations and as a result ensure that the vehicle which is following can be braked in the shortest possible time when the vehicle which is travelling ahead is slowing down or when there is a third vehicle moving into the gap. The minimum braking torque is advantageously generated in all dynamic transition phases of the vehicle which is following, that is to say in particular in acceleration and braking phases. If appropriate, a braking torque can also be applied when the vehicle speed is constant; however, the braking torque is lower than the drive torque when the speed is constant and also in acceleration phases.

The braking torque can, if appropriate, also be at least temporarily reduced, in particular if the distance exceeds a distance threshold, in order to prevent overloading of the brake system.

The automatic setting of the speed is advantageously switched off if the driver expresses a wish, for example by excessively depressing the acceleration pedal, for a vehicle actual speed which exceeds the vehicle setpoint speed. In this case, the driver's wish has priority over the automatic setting of the speed. If appropriate, it is also possible to take into account a tolerance range which exceeds the setpoint speed and within which the driver can move the vehicle by excessively depressing the acceleration pedal without the automatic setting of the speed being immediately switched off. In this case, the automatic setting of the speed is switched off only when the tolerance range is exceeded. As a result, it is possible that, within the tolerance range, the driver can, by actuating the acceleration pedal, follow a vehicle which is moving quickly ahead while still having the automatic setting of the speed remain activated during a reduction in the depression of the acceleration pedal.

When the system is switched off, any existing braking torque is advantageously not reduced suddenly but rather in accordance with a predefined characteristic curve in order to avoid a sudden jolt and thus possible annoyance of the driver.

The device according to the invention for automatically setting the speed includes a measuring device for determining the distance and the relative speed between the vehicle and an obstacle, in particular a vehicle which is travelling ahead. A control unit, in which actuation signals which can be used to set actuation elements in the vehicle causes the vehicle to automatically approximate the vehicle actual speed to a vehicle setpoint speed which is to be determined from the measurement signals in accordance with a predefined relationship are generated as a function of measurement signals which are recorded in the measuring device. The actuation signals, which act in particular on the braking device in the vehicle, the engine management system and/or the actuation device which regulates the air supply are generated in such a way that the vehicle actual speed is approximated to a setpoint speed which does not exceed the speed of the obstacle which is moving away and is at the same time limited by a limiting speed which is predefined or to be determined. This device for automatically setting the speed in the vehicle is suitable in particular for carrying out the prescribed method with all the method steps.

BRIEF DESCRIPTION OF THE DRAWINGS

Further advantageous refinements can be found in the description of the figures and the drawings, in which.

DETAILED DESCRIPTION OF THE PREFERRED EMBODIMENT

Figure 1:
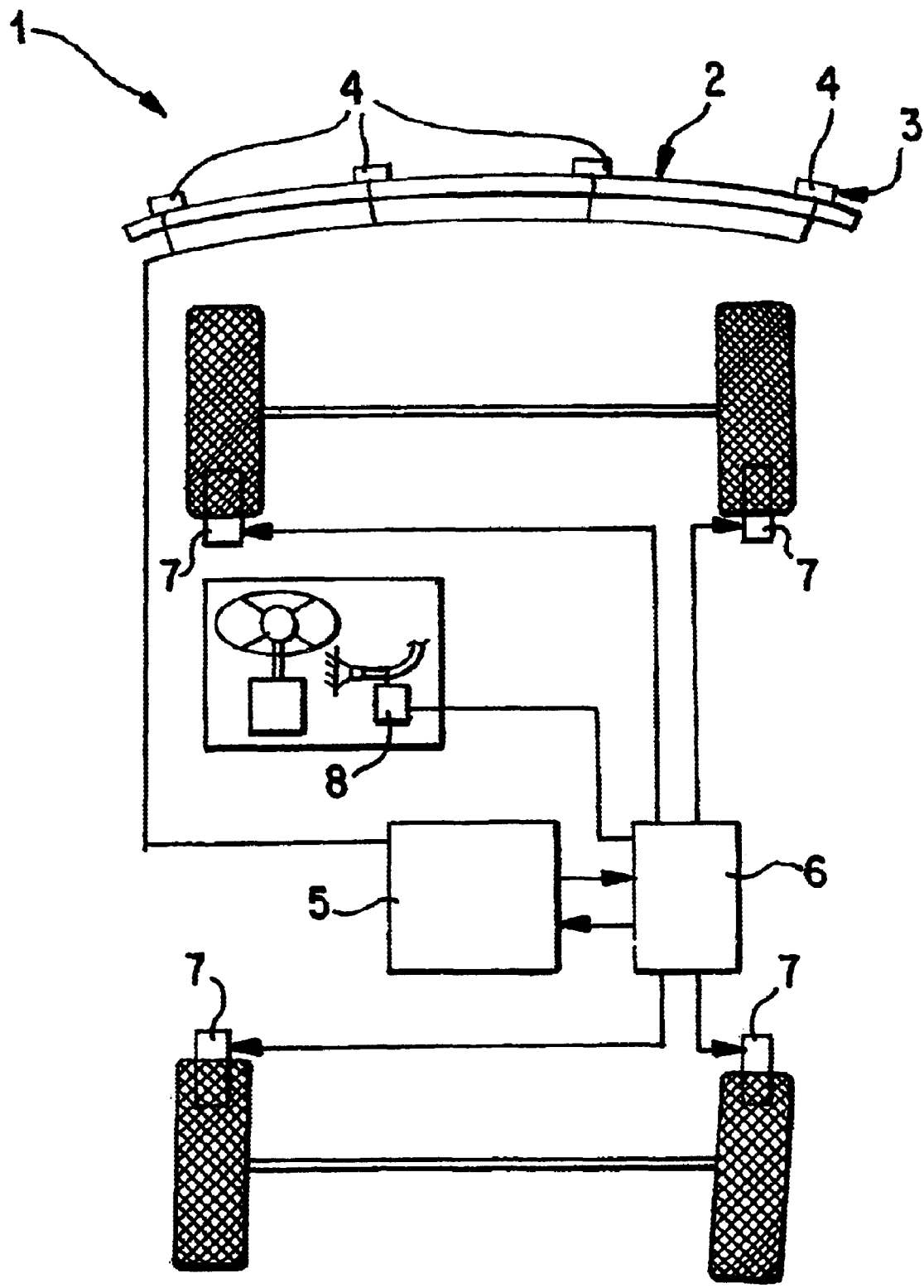
FIG. 1 shows a schematic view of a vehicle which is equipped with automatic setting of the speed.

The vehicle 1 which is illustrated in FIG. 1 is equipped with a device 2 for automatically setting the speed, in particular in the low speed range, which device 2 includes a measuring device 3 with distance sensors 4 in the front region of the vehicle, a control unit 5, a braking device 6, which is configured in particular as an electrohydraulic brake and can be set by means of actuation signals, wheel speed sensors 7 and a pedal signal transmitter 8 for sensing the actuation of the acceleration pedal. In order to automatically set the speed, measurement signals from the distance sensors 4 which represent the distance between the vehicle 1 and an obstacle lying ahead, in particular a vehicle travelling ahead, are processed in the control unit 5. The control unit 5 also receives measurement signals from the braking device 6, the wheel speed sensors 7 and the pedal signal transmitter 8. A vehicle setpoint speed, which depends in particular on the distance from the obstacle lying ahead and on the relative speed between the vehicle and the obstacle lying ahead or travelling ahead and also expediently on further safety-related criteria is determined from the measurement signals in accordance with a relationship which is stored in the control unit.

Actuation signals which are fed to the braking device 6 in order to generate a braking torque in the vehicle brake, the engine management system for setting the ignition time and fuel injection and the actuation elements which regulate the air supply to the cylinders are generated in the control unit 5.

Figure 2:
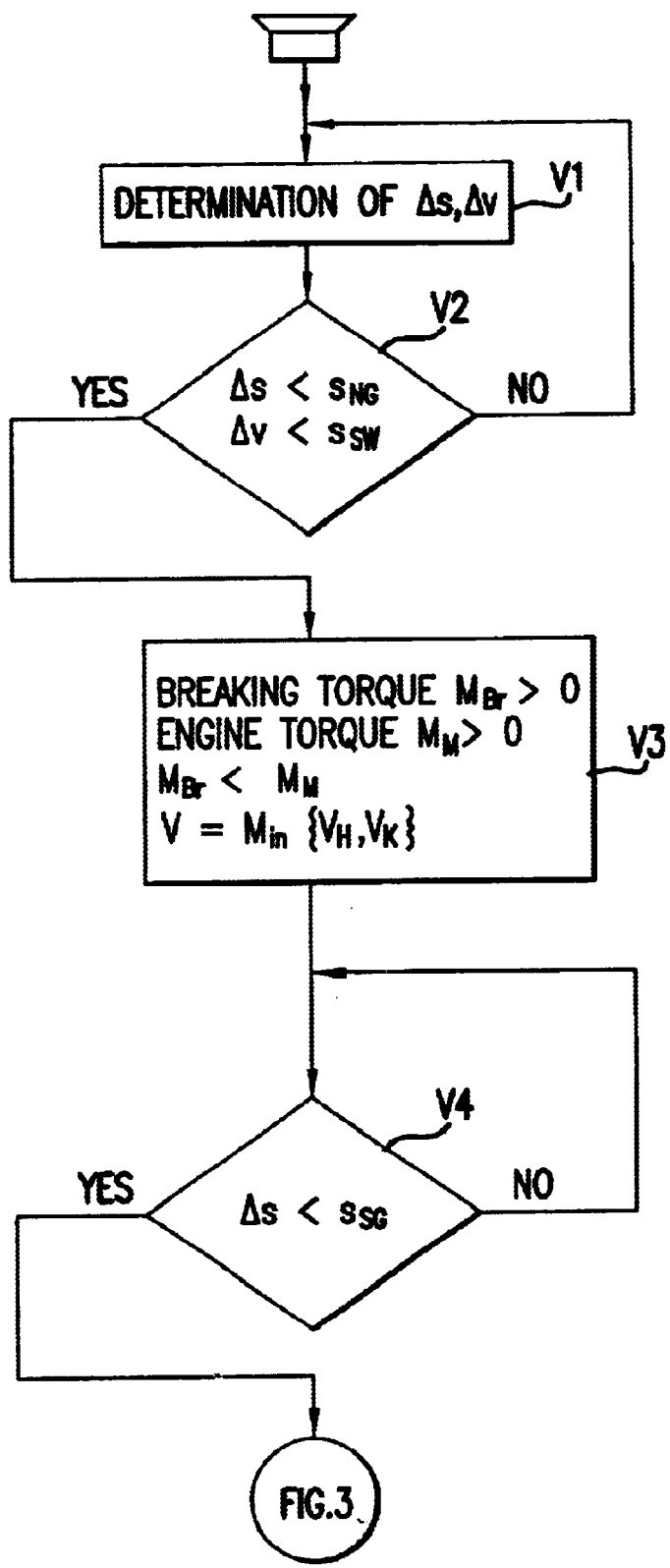
FIG. 2 shows a flowchart with individual method steps for automatically setting the speed of a vehicle which is following a vehicle travelling ahead.

According to the flowchart illustrated in FIG. 2, the relative distance $\Delta s$ and the relative speed $\Delta v$ between the vehicle which is equipped with automatic setting of the speed and an obstacle ahead, in particular a vehicle travelling ahead, is firstly determined in a first method step V1. The measurement and determination of the relative distance $\Delta s$ and of relative speed $\Delta v$ is carried out at regular time intervals, independently of the activation or of the current phase of the automatic setting of the speed.

The interrogation carried out in the following method step V2 constitutes an activation condition for the activation of the automatic setting of the speed. In step V2, the relative distance $\Delta s$ is checked to determine if it drops below a proximity limit $s_{NG}$; if this is not the case the automatic setting of the speed is not activated and the system returns to the first method step V1, in accordance with the No branching operation. If the relative distance $\Delta s$ is checked to determine if it drops below the proximity limit $s_{NG}$, it is advantageously checked, as a further condition which is to be additionally fulfilled, whether the relative speed $\Delta v$ drops below a threshold value $v_{SW}$. If this is not the case, the system again returns to the method step V1 in accordance with the No branching operation. If, on the other hand, the relative speed $\Delta v$ is lower than the threshold value $v_{SW}$, both conditions from the method step V2 are fulfilled; the automatic setting of the speed is activated and the system continues to the following method step V3 in accordance with the Yes branching operation.

The proximity limit $s_{NG}$ and the speed threshold value $v_{SW}$ are expediently permanently predefined parameters which are stored in the control unit. Alternatively, it may however also be expedient to derive these values adaptively from the current events on the road or for them to be predefined by the driver. Finally, it may also be expedient for the two conditions which are to be checked in method step V2 not to be checked cumulatively but rather alternatively, and for the system to continue from method step V2 to the following method step V3 if only one of the conditions from the method step V2 is fulfilled.

In the following method step V3, a braking torque $M_{Br}>0$ is generated by means of the braking device of the vehicle. At the same time, a driving engine torque $M_M>0$ is generated, it being predefined as an additional condition that the braking torque $M_{Br}$ is smaller than the engine torque $M_M$, in order to permit the vehicle to move away automatically.

In addition, in method step V3 the current speed v of the vehicle is set to a minimum of a pair of values which is formed by the speed $v_H$ of the obstacle and a crawling speed $v_{Kr}$. The speed $v_H$ of the obstacle can be determined in the control unit from the measured or calculated relative speed $\Delta v$ between the vehicle and the obstacle and the vehicle's own speed v. The crawling speed $v_{Kr}$ constitutes a limiting speed which is expediently predefined as a fixed value and stored in the control unit. The limiting of the current vehicle speed v to the crawling speed $v_{Kr}$ ensures that when the automatic setting of the speed is activated, the vehicle can follow the obstacle travelling ahead at the same speed as the obstacle, but at maximum up to the crawling speed $v_{Kr}$.

In the next method step V4 it is checked whether the relative distance $\Delta s$ has then become smaller than a stopping limit $s_{SG}$, the undershooting of which causes the vehicle to be braked to a standstill. If this is not the case, the current status is maintained; the system returns, in accordance with the No branching operation, to a renewed, cyclical checking of the condition of the method step V4. The cyclical checking is continued until the condition of the method step V4 is fulfilled.

Figure 3:
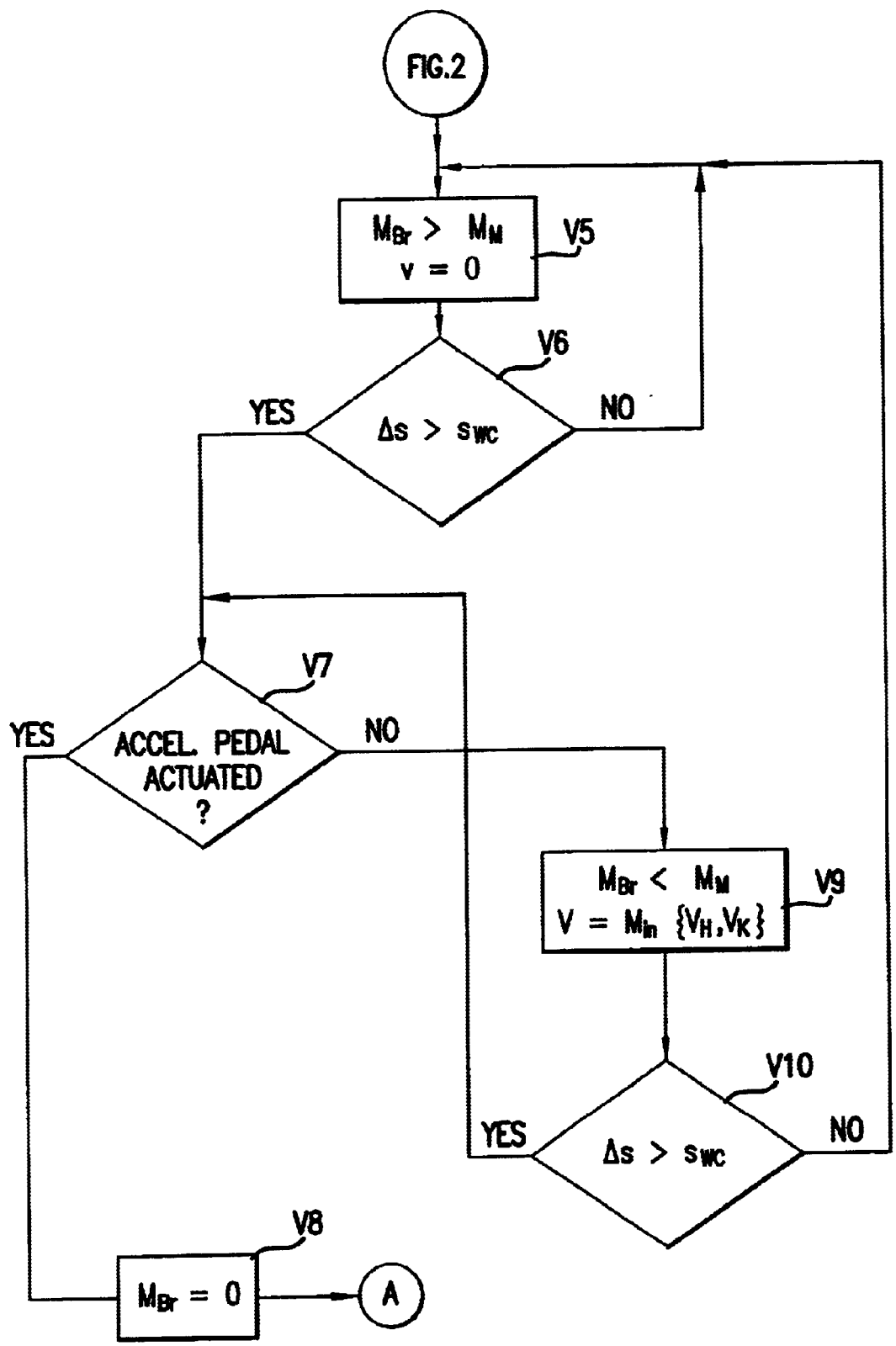
FIG. 3 shows the continuation of the flowchart from FIG. 2.

If the relative distance $\Delta s$ drops below the stopping limit $s_{SG}$, the system continues (see FIG. 3), in accordance with the Yes branching operation of the method step 5, to the following method step V5 in which the relationship between the engine braking torque $M_{Br}$ and driving engine torque $M_M$ is reversed so that the engine braking torque $M_{Br}$ then exceeds the engine torque $M_M$ and the vehicle is braked to a standstill at the speed v=0.

The following method step V6 contains a condition with which it is checked whether the vehicle can automatically travel onward. For this purpose it is checked whether the relative distance $\Delta s$ between the vehicle and obstacle exceeds a distance threshold $s_{WG}$. If this is not the case, the system returns, in accordance with the No branching operation of the method step V6, to the method step V5 and the vehicle remains at a standstill. However, if the condition of the method step V6 is fulfilled, this means that the distance from the obstacle ahead has increased and the condition for onward travel is fulfilled. In this case, the system continues to the following method step V7 in accordance with the Yes branching operation.

In the method step V7 there is a check to determine whether the accelerator pedal is actuated by the driver. If this is the case, the automatic setting of the speed is terminated because the driver's wish has priority over the automatically controlled travel of the vehicle. However, it is expediently taken into account here whether the accelerator pedal actuation generated by the driver would result, under the current external circumstances, in a higher speed than that speed which is predefined by the automatic setting of the speed, and only if this is the case does the system continue into the Yes branching operation.

When there is a corresponding actuation of the accelerator pedal, the system continues, in accordance with the Yes branching operation of the method step V7, to the method step V8 in which the engine braking torque $M_{Br}$ is reduced to zero, if appropriate taking into account a reduction characteristic curve. The method is then terminated and the system can return to the start of the entire sequence at the method step V1.

If the accelerator pedal is not actuated, the system continues to the method step V9 in accordance with the No branching operation of the method step V7. In the method step V9, the engine braking torque $M_{Br}$ is set to a value which is smaller than the driving engine torque $M_M$, because the conditions for onward travel are now present and the vehicle is to be moved again. The current vehicle speed v is set to the smaller value of the speed $v_H$ of the obstacle and the crawling speed $v_{Kr}$.

In the method step V10 there is then a check to determine whether the relative distance $\Delta s$ exceeds the stopping limit $s_{SG}$. This check is intended to ensure that the vehicle is automatically moved off only if a stopping limit $s_{SG}$ which represents a safety distance is exceeded. If this is not the case, the system returns to the method step V5 in accordance with the No branching operation and the vehicle is braked to a standstill. Otherwise, the system branches, in accordance with the Yes branching operation, to the method step V7 in which a renewed check is carried out to determine whether the accelerator pedal is actuated.

What is claimed is:

1. A method for automatically setting the speed in a vehicle, comprising the steps of:

sensing a first distance and a relative speed between the vehicle and an obstacle;

calculating, as a function of said first distance and said relative speed, one of a braking torque and a drive torque;

generating said one of a braking torque and a drive torque independent of a driver of said vehicle in order to automatically approximate an actual speed of said vehicle with a vehicle setpoint speed;

predetermining a maximum permissible limiting speed;

setting the vehicle setpoint speed to a speed of the obstacle but limited to a maximum value of said predetermined maximum limiting speed whenever said obstacle is moving away from said vehicle.

2. The method according to claim 1, including the step of maintaining the automatic setting of the speed only as long as a distance ($\Delta s$) between the vehicle and the obstacle is below a proximity limit ($s_{NG}$).

3. The method according to claim 2, wherein the automatic setting of the speed is maintained only as long as the distance ($\Delta s$) between the vehicle (1) and obstacle exceeds a stopping limit ($s_{SG}$), the stopping limit ($s_{SG}$) being smaller than the proximity limit ($s_{NG}$).

4. The method according to one claim 1, wherein the automatic setting of the speed is used exclusively in the low speed range and a crawling speed ($v_{Kr}$) is predefined as the limiting speed.

5. The method according to claim 1, wherein, when a stopping limit ($s_{SG}$) between the vehicle and obstacle is undershot, the vehicle is automatically braked to a standstill.

6. The method according to claim 1, wherein the idling mode is automatically set when a vehicle with an automatic gearbox is stationary.

7. The method according to claim 1, wherein the automatic setting of the speed is switched off if the vehicle actual speed which exceeds the vehicle setpoint speed is set by the driver.

8. The method according to claim 1, wherein, when the automatic setting of the speed is activated, a minimum braking torque ($M_{Br}$) is generated at least in acceleration and braking phases.

9. The method according to claim 8, wherein, when the automatic setting of the speed is switched off, the braking torque ($M_{Br}$) is reduced in accordance with a predefined characteristic curve.

10. The method according to claim 8, wherein the braking torque ($M_{Br}$) is reduced if the distance ($\Delta s$) exceeds a distance threshold ($s_{WG}$).

11. The method according to claim 8, wherein the engine torque ($M_M$) is increased above the value of the braking torque ($M_{Br}$) if the distance ($\Delta s$) exceeds a distance threshold ($s_{WG}$).

12. The method according to claims 8, wherein, even when the vehicle actual speed (v) is constant, a braking torque ($M_{Br}$) is generated which is however smaller than the drive torque ($M_M$).

13. A system for automatically setting a speed in a vehicle, comprising:

a measuring device for determining a distance and a relative speed between the vehicle and an obstacle;

a control unit for providing actuating signals to actuating elements in the vehicle in order to automatically set an actual speed of the vehicle to be equal to a vehicle setpoint speed wherein said actuation signals are generated as a function of measurement signals output from said measuring device and wherein said actuating signals from said control unit determine that the vehicle setpoint speed is restricted to a speed of the obstacle limited by a maximum value of a permissible limiting speed whenever the obstacle is moving away from the vehicle.

* * * * *